United States Patent
Calder

(10) Patent No.: US 9,829,333 B1
(45) Date of Patent: Nov. 28, 2017

(54) ROBOTIC TRAFFIC DENSITY BASED GUIDANCE

(71) Applicant: Amazon Technologies, Inc., Seattle, WA (US)

(72) Inventor: Michael Calder, Shrewsbury, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/264,331

(22) Filed: Sep. 13, 2016

(51) Int. Cl.
*G01C 21/34* (2006.01)
*G08G 1/16* (2006.01)
*G05D 1/02* (2006.01)

(52) U.S. Cl.
CPC ....... *G01C 21/3492* (2013.01); *G05D 1/0214* (2013.01); *G08G 1/166* (2013.01); *Y10S 901/01* (2013.01)

(58) Field of Classification Search
CPC .. G01C 21/3492; G05D 1/0214; G08G 1/166; Y10S 901/01
USPC ......................................................... 701/533
See application file for complete search history.

(56) References Cited

U.S. PATENT DOCUMENTS

| | | | |
|---|---|---|---|
| 8,280,547 B2 | 10/2012 | D'Andrea et al. | |
| 9,087,314 B2 | 7/2015 | Hoffman et al. | |
| 2012/0330458 A1* | 12/2012 | Weiss | B66F 9/063 700/216 |
| 2013/0317642 A1* | 11/2013 | Asaria | G06Q 50/28 700/216 |
| 2013/0325244 A1* | 12/2013 | Wang | G05D 1/028 701/26 |
| 2015/0088310 A1* | 3/2015 | Pinter | G06Q 50/22 700/253 |
| 2016/0062345 A1 | 3/2016 | Stubbs et al. | |
| 2016/0101940 A1* | 4/2016 | Grinnell | G05D 1/0297 700/216 |
| 2016/0271800 A1* | 9/2016 | Stubbs | B25J 9/1666 |
| 2016/0274586 A1* | 9/2016 | Stubbs | G06K 7/10366 |

* cited by examiner

*Primary Examiner* — Tyler J Lee
(74) *Attorney, Agent, or Firm* — Knobbe Martens Olson & Bear LLP

(57) ABSTRACT

Features are disclosed for providing guidance regarding robotic traffic density to humans working in the same physical area as robots. Through analysis of the planned and/or historical routes of the robotic traffic, traffic densities can be identified for the physical area. The densities may be used to generate a heat map or other visual display for presentation to human workers. This allows the workers to move through the physical area with a better understanding of where robot traffic is dense and how to best avoid interrupting those assets.

20 Claims, 7 Drawing Sheets

US 9,829,333 B1

ROBOTIC TRAFFIC DENSITY BASED GUIDANCE

BACKGROUND

Modern inventory systems, such as those in mail order warehouses, supply chain distribution centers, airport luggage systems, and custom-order manufacturing facilities, can include a number of complex systems, including robots, automated shelving systems, radio frequency identification (RFID), and automated scheduling and routing equipment. Many systems, for example, include robots that travel to shelving systems to retrieve items, or the shelves themselves, and return them to a central location for additional processing.

Automated warehouses exist that use robots, for example, to move items or shelves from a storage location in the warehouse to a shipping location (e.g., for inventory items to be boxed and shipped) according to carefully planned and coordinated routes. However, the paths of a robot and one or more humans working in the warehouse may cross. Direct contact between the human workers and the robots can be problematic, and a maintenance and/or performance issue for the robots. For example, some robots may enter a stopped state if a human is detected nearby. This causes the robot to interrupt the task it is currently performing until the human leaves the nearby area or modify its route to avoid the human. The contact can also impact the rate at which the human worker can move through the workspace. For example, if many robots are traveling through a common area, the human worker may need to wait for the robot traffic in the common area to clear before proceeding.

BRIEF DESCRIPTION OF THE DRAWINGS

Embodiments of various inventive features will now be described with reference to the following drawings. Throughout the drawings, the examples shown may re-use reference numbers to indicate correspondence between referenced elements. The drawings are provided to illustrate example embodiments described herein and are not intended to limit the scope of the claims.

DETAILED DESCRIPTION

Figure 1:
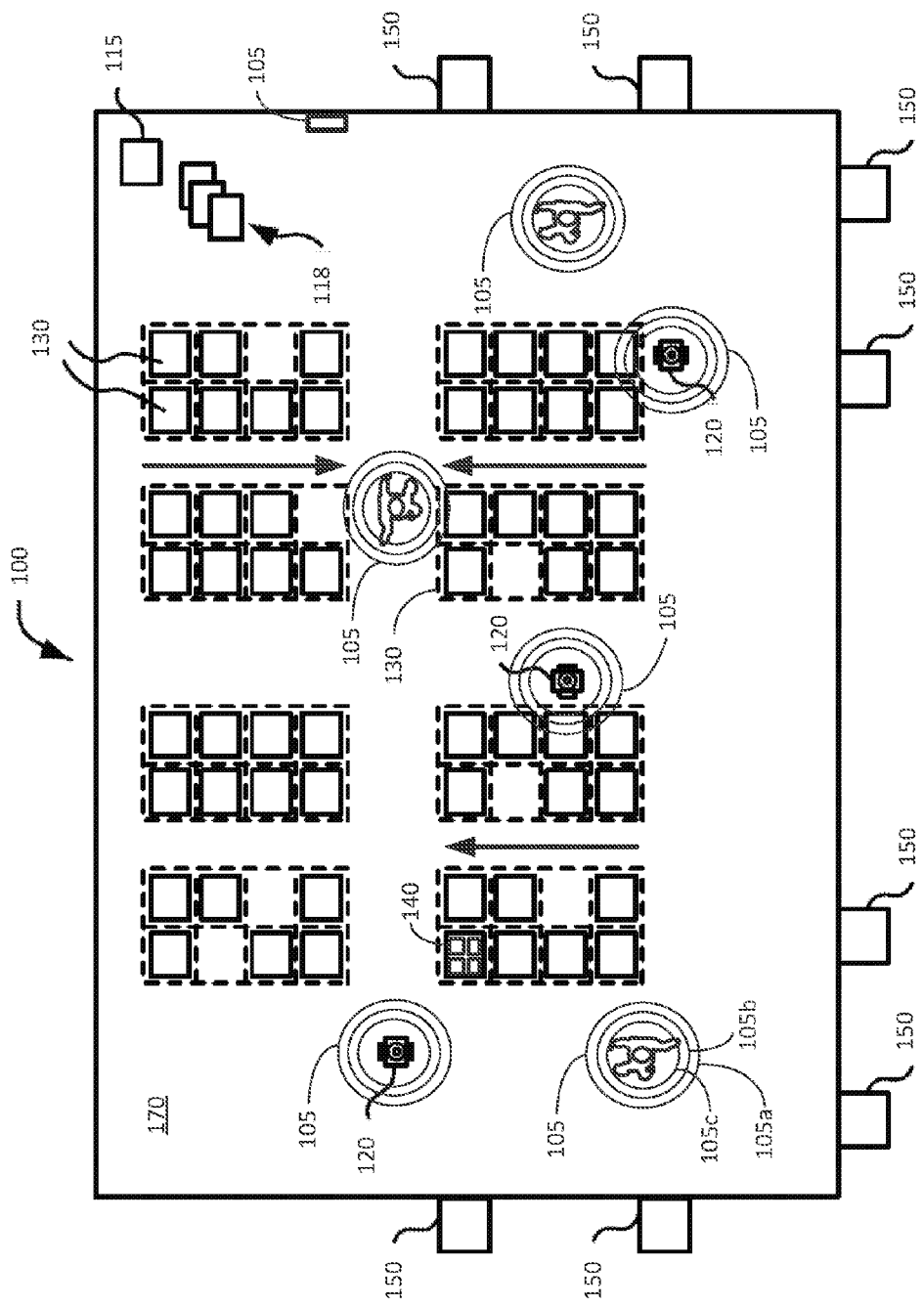
FIG. 1 is a pictorial diagram depicting an illustrative inventory system environment.

Modern inventory systems may include mobile drive units that receive commands to perform tasks such moving to a location, lifting a payload at the location, and carrying the payload to another location. A mobile drive unit may be an autonomous asset, such as a robot or a drone, and may include sensors to detect aspects of an operational area in which it is being implemented and execute received commands.

One way to avoid unscheduled interactions between humans and mobile drive units is to allocate a first block of time when only robots may operate within a workspace and a second block of time when only humans may operate within the workspace. This way of avoiding interactions introduces inefficiencies as only one of the humans or the mobile drive units are active for a block of time.

Another way to avoid unscheduled interactions is to treat the humans as robots and provide specific, predetermined routes for the intended human activity. However, this way of avoiding interactions ignores human perception and fails to account for unexpected events that a human can easily identify and avoid.

Instead of specifically planning a path for a human through a grid of moving autonomous assets, features are described for generating traffic density based guidance information, such as a traffic density map, to provide a perceivable guide for humans to use when navigating the workspace. One example of a traffic density map is a color coded congestion heat map. The congestion heat map may be colored red in areas where more robots are planning to go and a gradient from red to orange/yellow/green may be used to color areas with less expected traffic. The traffic density map may be generated through analysis of planned routes for the mobile drive units within the workspace, and may be displayed to human workers. The analysis may include consideration of one or more of: currently planned routes, historical routes, and any updates to planned routes.

The features described may reduce the interruptions of planned routes for mobile drive units by humans in the workspace. For example, a human may need to get to a specific location in a workspace to pick up an item. The traffic density map may be presented on a user interface, such as via a mobile device carried by the human, to assist in intelligent navigation the workspace. The map could additionally or alternatively be displayed on one or more fixed displays, such as projection screens, mounted in or near the workspace. The map can assist in minimizing overall performance impact to the inventory system by the human's activities. For example, if the human walks through areas of high congestion or traffic, the mobile drive units near that area may need to slow down and/or stop. Such disruptions can have a negative effect on the mobile drive units' time to complete their assigned tasks than if the human went through green (e.g., less traffic dense) areas.

The traffic density map may include graphical representations of the current locations of mobile drive units within the workspace. The graphical representations may be color coded to indicate an operational status of mobile drive unit such as idle, charging, moving, moving with item, malfunction, speed, etc. The graphical representations may include an icon such as an arrow to show the direction a mobile drive unit is moving or other operational status. In some implementations, physical structures within the workspace may be displayed via the traffic density map. The traffic density map may be updated such as every 20 seconds.

The features described allow more freedom than directly planning a path through the workspace for a human, and enable each human to be more intelligent than if they did not have the traffic/congestion information visually available. Because the traffic density map provides a real time or near-real-time presentation of what the mobile drive units are planning to do, the human, assisted by the traffic density based information, can adapt their route with greater overall efficiency.

FIG. 1 is a pictorial diagram depicting an illustrative inventory system environment. FIG. 1 illustrates the components of an inventory system 100 in which a mobile drive unit 120 may operate. The inventory system 100 may include a management device 115, one or more mobile drive units 120, one or more inventory holders 130, and one or more inventory stations 150. A mobile drive unit may transport one or more of the inventory holders 130 between points within a workspace 170 in response to commands communicated by the management device 115. Each inventory holder 130 may store one or more types of inventory items 140. As a result, the inventory system 100 is capable of moving inventory items between locations within the workspace 170 to facilitate the entry, processing, and/or removal of inventory items from the inventory system 100 and the completion of other tasks involving inventory items.

The management device 115 may assign tasks to appropriate components of the inventory system 100 and coordinate operation of the various components in completing the tasks. These tasks may relate not only to the movement and processing of inventory items, but also to the management and maintenance of the components of the inventory system 100. For example, the management device 115 may assign portions of the workspace 170 as parking spaces for the mobile drive units 120, the scheduled recharge or replacement of mobile drive unit batteries, the storage of empty inventory holders, or any other operations associated with the functionality supported by the inventory system 100 and its various components. The management device 115 may identify components of the inventory system 100 to perform these tasks and communicate appropriate commands and/or data to the identified components to facilitate completion of these operations.

Although shown in FIG. 1 as a single, discrete component, the management device 115 may represent multiple components and may represent or include portions of the mobile drive units 120 or other elements of the inventory system 100. Interactions between a particular mobile drive unit and the management device 115 that are described may, in some embodiments, represent peer-to-peer communication between two or more of the mobile drive units 120. The components and operation of an example embodiment of the management device 115 are discussed further below with respect to FIG. 5.

A mobile drive unit may be implemented as an independent, self-powered, motorized device configured to move about the workspace 170. The mobile drive units 120 may be capable of communicating with the management device 115 to receive information identifying selected inventory holders 130, to transmit the locations of the mobile drive units 120, or to exchange any other suitable information to be used by the management device 115 or the mobile drive units 120 during operation. The mobile drive units 120 may communicate with the management device 115 wirelessly and/or using wired connections between the mobile drive units 120 and the management device 115. As one example, some mobile drive units 120 may communicate with the management device 115 and/or with one another using 802.11, BLUETOOTH®, or Infrared Data Association (IrDA) standards, or any other appropriate standardized or non-standard wireless communication protocol. As another example, in a tracked inventory system, tracks or other guidance elements upon which the mobile drive units 120 move may be wired to facilitate communication between the mobile drive units 120 and other components of the inventory system 100.

The mobile drive unit 120 may include one or more robotic arms, wheels, cameras, position sensors, and the like. The mobile drive unit 120 may activate one or more of these elements as part of executing a task. For example, if the task is to move an inventory holder from one location to another, the task may identify the inventory holder, its current location, and the destination location. The task may also include a route to the current location of the inventory holder and then to the destination location. The mobile drive unit 120 may then interpret the commands to activate wheels to move along the route, position sensors and/or cameras to detect location and obstacles, and motors or robotic arms to lift the inventory holder. Based at least in part on the task, the mobile drive unit 120 will determine which element to activate, how much to activate it (e.g., how fast to spin the wheel, how much torque for lifting), and how long to activate it. The task may be received from the management device 115.

The inventory holders 130 may store inventory items. One or more of the inventory holders 130 may include multiple storage bins with each storage bin capable of holding one or more types of inventory items. The inventory holders 130 may include structural features to facilitate carrying, rolling, and/or otherwise moving the inventory holders 130 by mobile drive units. The inventory holder 130 may include propulsion means to supplement that provided by a mobile drive unit when moving inventory holder 130.

Inventory items 140 may hang from hooks or bars (not shown) within or on one or more of the inventory holders 130. An inventory holder may store inventory items 140 in any appropriate manner within the inventory holder and/or on the external surface of inventory holder. Inventory items may represent any objects suitable for storage, retrieval, and/or processing in an automated inventory system.

An inventory holder may include a plurality of faces, and each bin of the inventory holder may be accessible through one or more faces of the inventory holder. For example, an inventory holder may include four faces. In such an embodiment, bins located at a corner of two faces may be accessible through either of those two faces, while each of the other bins is accessible through an opening in one of the four faces. One or more of the mobile drive units 120 may be configured to rotate such an inventory holder at appropriate times to present a particular face and the bins associated with that face to an operator or other components of inventory system 100.

A particular inventory holder 130 may be considered to be currently "storing" a particular inventory item if the inventory holder 130 currently holds one or more units of that type. As one example, the inventory system 100 may represent a mail order warehouse facility, and inventory items may represent merchandise stored in the warehouse facility. During operation, one or more of the mobile drive units 120 may retrieve the inventory holders 130 containing one or more inventory items requested to be packed for delivery to a customer or the inventory holders 130 carrying pallets containing aggregated collections of inventory items for shipment. In some implementations, containers (e.g., boxes) including completed orders may themselves represent inventory items.

The inventory system 100 may include one or more inventory stations 150. An inventory station may represent a location designated for the completion of particular tasks involving inventory items. Such tasks may include the removal of inventory items from an inventory holder, the introduction of inventory items into an inventory holder, the counting of inventory items in an inventory holder, the decomposition of inventory items (e.g., from pallet- or case-sized groups to individual inventory items), the consolidation of inventory items between inventory holders, and/or the processing or handling of inventory items in any other suitable manner.

The inventory stations 150 may represent physical locations where a particular task involving inventory items can be completed within the workspace 170. In some implementations, the inventory stations 150 may represent both the physical location and also any appropriate equipment for processing or handling inventory items, such as scanners for monitoring the flow of inventory items in and out of the inventory system 100, communication interfaces for communicating with the management device 115, and/or any other suitable item processing components.

The inventory stations 150 may be controlled, entirely or in part, by human operators or may be fully automated. Moreover, the human or automated operators of inventory stations may be capable of performing certain tasks upon inventory items, such as packing, counting, or transferring inventory items, as part of the operation of the inventory system 100.

The workspace 170 represents an area associated with the inventory system 100 in which the mobile drive units 120 can move and/or the inventory holders 130 can be stored. For example, the workspace 170 may represent all or part of the floor of a mail-order warehouse in which the inventory system 100 operates. Although FIG. 1 shows, for the purposes of illustration, an inventory system in which the workspace 170 includes fixed, predetermined, and finite physical spaces, an inventory system may include mobile drive units and/or inventory holders that are configured to operate within a workspace that is of variable dimensions and/or an arbitrary geometry. While the workspace 170 shown in FIG. 1 is entirely enclosed in a building, the inventory system 100 may utilize one or more workspaces in which some or all of the workspaces are located outdoors, within a vehicle (such as a cargo ship), or otherwise unconstrained by any fixed structure.

The management device 115 may select appropriate components to complete particular tasks and transmit task assignment messages 118 to the selected components to trigger completion of the relevant tasks. The task assignment message 118 may include information identifying one or more tasks to be completed by at least one component of the inventory system 100. These tasks may relate to the retrieval, storage, replenishment, and counting of inventory items and/or the management of mobile drive units, inventory holders, inventory stations, and/or other components of inventory system 100. Depending on the component and the task to be completed, a particular task assignment message 118 may include information identifying locations, components, and/or actions associated with the corresponding task and/or any other appropriate information to be used by the relevant component in completing the assigned task.

The management device 115 may generate task assignment messages 118 based, in part, on inventory requests that the management device 115 receives from other components of the inventory system 100 and/or from external components in communication with the management device 115. An inventory request may identify particular operations to be completed involving inventory items stored or to be stored within the inventory system 100. For example, an inventory request may represent a shipping order specifying particular inventory items that have been purchased by a customer and that are to be retrieved from the inventory system 100 for shipment to the customer. The management device 115 may also generate task assignment messages 118 independently of such inventory requests, as part of the overall management and maintenance of the inventory system 100. For example, the management device 115 may generate one or more task assignment messages in response to the occurrence of a particular event (e.g., in response to a mobile drive unit requesting a space to park), according to a predetermined schedule (e.g., as part of a daily start-up routine), or at any appropriate time based on the configuration and characteristics of the inventory system 100. After generating one or more task assignment messages 118, the management device 115 may transmit the generated task assignment messages 118 to appropriate components for completion of the corresponding task. The relevant components may then execute their assigned tasks.

While executing a task, a mobile drive unit 120 or human worker may have a work zone 105. The work zone 105 may identify an area around an entity within the workspace 170 needed to perform a task. The work zone 105 may allow the inventory system 100 to keep track of the entities and where mobile drive units can be safely moved within the workspace 170.

Further examples of inventory systems and features that may be included in the inventory system 100 are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS," each of which is incorporated herein by reference in its entirety.

Figure 2:
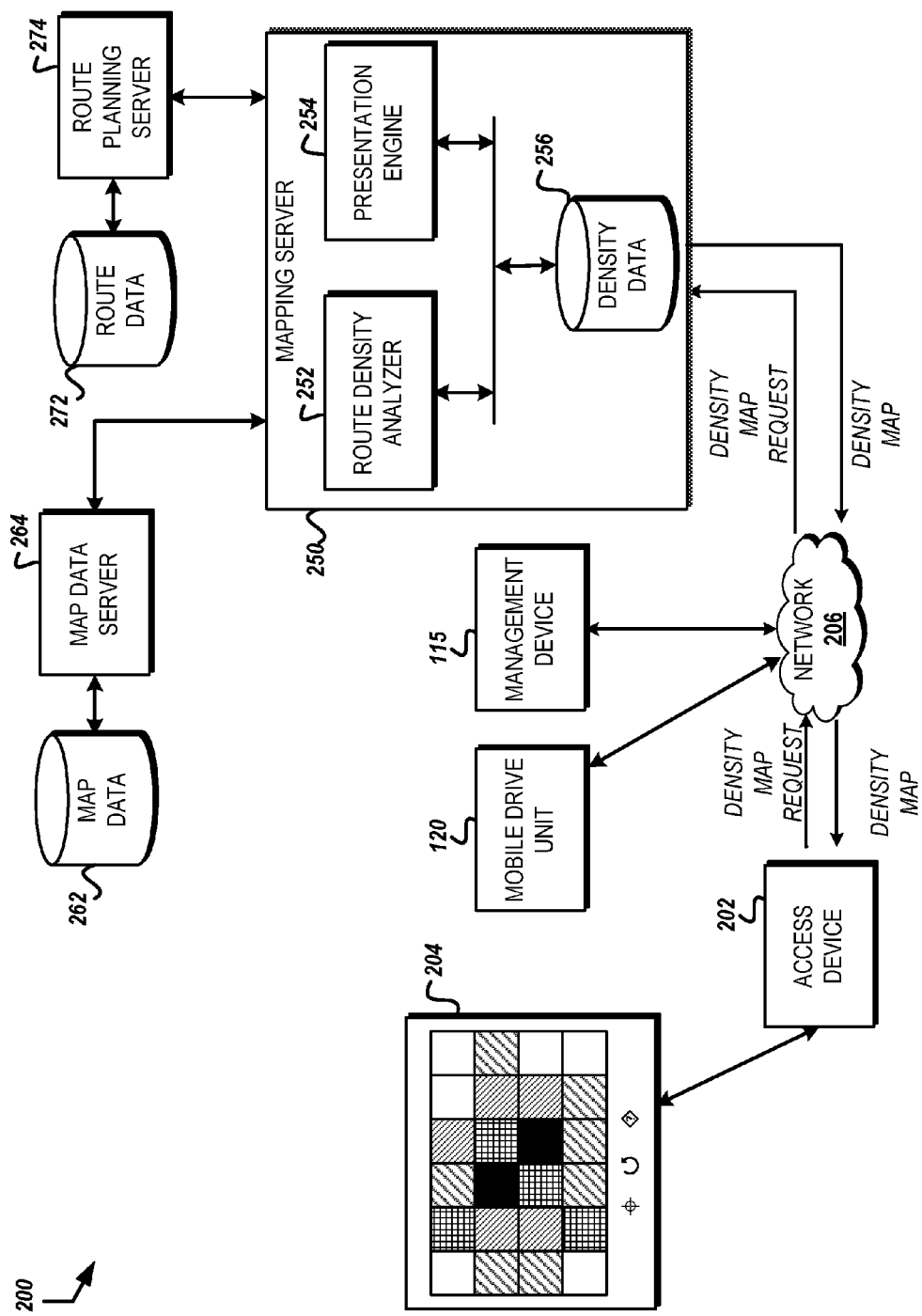
FIG. 2 is a pictorial diagram depicting an illustrative traffic density guidance system.

FIG. 2 is a pictorial diagram depicting an illustrative traffic density guidance system. The traffic density guidance system 200 shown in FIG. 2 may be included as part of an inventory system such as the inventory system 100. The traffic density guidance system 200 may generate a traffic density map 204 based on present and/or historical mobile drive unit routes. The route data may be stored in a route data storage device 272 and accessed via a route planning server 274. The route planning server 274 may be provided to identify optimal routes for the mobile drive units with a workspace. The optimal routing may include consideration of the location of each mobile drive unit, the capabilities of the mobile drive units, inventory holders and/or items held by/in respective inventory holders, destination within the workspace for the items carried by the mobile drive unit (e.g., packing for shipment or transferring to another workspace), and other detectable characteristic of the inventory system or entity therein.

The workspace may be represented using map data. The map data may be stored in a map data storage device or system 262. The map data may include images of the workspace. The map data may include geospatial annotations for the workspace such as location markers. The map data may include elevation data for portions of the workspace identifying, for example, ramps, stairs, or other elevation changes. In some implementations, the traffic density map 204 may be generated as a multi-layer map showing an image of the workspace with a semi-transparent color coded overlay where each color is associated with a traffic density.

A mapping server 250 may be included in the traffic density guidance system 200 to generate traffic density based guidance information such as the traffic density map 204. The mapping server 250 may provide the traffic density map 204 to an access device 202 via a network 206. The access device 202 may be an electronic communication device configured to communicate using machine readable messages exchanged with the mapping server 250. Examples of the access device 202 include a smartphone, a tablet computer, a desktop computer, a laptop computer, a set-top-box, a streaming media device, a feature phone, an augmented reality headset, a smart watch, and a television. The messages may be formatted according to a standardized protocol such as TCP/IP, HTTP, FTP, or the like. The transmission may be wired or wireless means. In some implementations, the traffic density map 204 may include interactive control elements to cause the access device 202 to obtain and transmit information to the mapping server 250. For example, a control element may be provided via the traffic density map 204 or an interface associated therewith that, when activated, causes the access device 202 to obtain and transmit the current location of the access device 202 to the mapping server 250. A control element may be provided that, when activated, refreshes the traffic density map 240 based on currently available route information. The refreshing of the map provides a real time presentation of the density information for the currently planned mobile drive units. A control element may be provided to request the mapping server 250 to generate one or more suggested routes for the human to take to a destination within the workspace. The routes may be provided to the access device 202 as part of the traffic density map 240 or an additional layer for presentation with the traffic density map 240.

Communications between the access device 202 and the mapping server 250 may be exchanged via a network 206. The network 206 may include one or more of a LAN, WAN, cellular network, satellite network, and/or the Internet. Connection to the network 206 may be, for example, via a wired, wireless, or combination of wired and wireless, communication link. The communications via the network 206 may include messages. The messages may be formatted and transmitted according to a standardized protocol such as TCP/IP, HTTP, FTP, or the like. In FIG. 2, the mapping server 250 is shown in direct communication with the route planning server 274 and the map data server 264. It will be understood that the communication between the mapping server 250 and one or both of the route planning server 274 and the map data server 264 may be via the network 206 and/or other communication channels.

To generate the traffic density map 204 and associated traffic density information for the access device or devices 202, the mapping server 250 may include a route density analyzer 252. The route density analyzer 252 may receive route information for the mobile drive units from the route planning server 274. In some implementations, the route density analyzer 252 may subscribe to receive notifications for route planning events generated by the route planning server 274. In such implementations, as the route planning server 274 generates or updates routes, the mapping server 250 may also receive the generated or updated route information. In some implementations, the subscription may be directed to the route planning server 274. Such implementations may be referred to as active subscription because the route information is received in response to an activity of the mapping server 250. In some implementations, the mapping server 250 may listen for route information transmitted from the route planning server 274 to mobile drive units within the workspace. For example, the route planning server 274 may wirelessly transmit messages including route information to the mobile drive units. The mapping server 250 can listen for these messages and determine the planned routes. Such an implementation may be referred to as passive subscription.

Whether actively or passively received, having obtained the route information the route density analyzer 252 may also obtain map data for the workspace where the routes will be executed. The map data may be partitioned into a number of sectors. The parsing may include dividing the workspace into a set of uniform sectors based on a predetermined distance. For example, the predetermined distance may be three feet. This distance is one factor determining the resolution for the traffic density map. The smaller the sector, the higher the resolution that can be provided. However, there is a tradeoff between high resolution and the resources needed to generate, transmit, and present the traffic density map. In some implementations, the resources available to the mapping server 250 and/or the access device 202 may be used to determine the resolution dynamically. For example, if the access device 202 has limited display area, a lower resolution may be desirable. As another example, if the mapping server 250 is processing thousands of routes, it may be desirable to reduce the resolution for all maps to provide lower resolution maps (e.g., larger sectors) at a faster rate than would be needed to generate higher resolution maps (e.g., smaller sectors).

The route density analyzer 252 may generate density information based on the paths of mobile drive units within the inventory system. The density information may indicate how much mobile drive unit traffic occurs at a location (e.g., sector) within a physical area of the workspace. The density information may include or be represented by a density value. For example, the density information may be represented by a count of the number of mobile drive units that are scheduled to pass over a location within the workspace within a defined time period. In such implementations, the route density analyzer 252 may analyze routes and determine the locations within the workspace traversed by a mobile drive unit. Each time a mobile drive unit path traverses a location, the count may be increased for the location.

The route density analyzer 252 may perform a more sophisticated traffic density analysis. For example, the route density analyzer 252 may consider one or more characteristics of the route such as routes to or from special locations within the workspace that can affect the flow of items within the inventory system. For example, a loading dock may be a critical point within the workspace. As such, any routes that traverse locations near (e.g., within a threshold distance of) the loading dock may be given higher priority to ensure that mobile drive units are not interrupted while near the loading dock. When analyzing the density for the locations near the loading dock, the density value for such locations may be increased by an amount greater than an amount applied for a location in a less critical location in the workspace.

Another or an alternative characteristic of a route that the route density analyzer 252 may consider is the set of items carried by the mobile drive unit. The number of items carried by a mobile drive unit may be positively correlated with the priority of the route of the mobile drive unit. This ensures that mobile drive units with more items are given higher priority within the inventory system. As another example, some workspaces include items that need to be processed more quickly than other items. As such, mobile drive units carrying items for expedited processing should be given priority over mobile drive units carrying other items. The route density analyzer 252 may weight the high priority routes (e.g., carrying expedited items) more than the lower priority routes when generating the density value for a location. Item priority may be obtained from a shipping system or order management system. For example, the route density analyzer 252 may receive a manifest for a route. The manifest may include item identifiers and/or order numbers carried by the mobile drive unit on the route. The item identifiers or order numbers may be included in a request message transmitted to the shipping or order management system. In response, the route density analyzer 252 may receive information about the items such as processing time, special handling instructions for an item (e.g., fragile, perishable, hazardous), or other information to be considered as part of the prioritization of the route.

The route density analyzer 252 may also obtain historical route information for the workspace. The historical route information may identify routes previously traversed by mobile drive units within the workspace. The historical route information may be obtained from the route planning server 274. For example, a request message may be transmitted from the route density analyzer 252 to the route planning server 274. The request message may include an indication that the route density analyzer 252 is requesting information for both planned routes and historical routes. The request message may also specify how many historical routes to receive. The amount may be identified by a traffic mapping service configuration value (e.g., absolute number of routes, time period, memory limit, etc.). The amount may be dynamically determined based on the resources available to the route planning server 274. For example, if the route density analyzer 252 is processing many routes, the route density analyzer 252 may choose to forego historical analysis until it has finished processing the backlog of analysis. The amount may be dynamically determined based on time. For example, the route density analyzer 252 may specify a period of time when requesting route information from the route planning server 274. The period of time may identify the historical period of interest. Historical routes within this period may be provided by the route planning server 274.

In some implementations, the historical route information may be obtained from a density data storage device 256. The density data storage device 256 may be a specially architected data storage device for storing high volumes of location data. The density values generated by the route density analyzer for sectors traversed by a given set of routes may be stored in the density data storage device 256. The density values may be stored in association with an identifier for the physical area to which the sectors relate and a timestamp indicating when the density values were generated. The route density analyzer 252 may retrieve previously generated density values for an area and include these density values when generating current density values for the sectors included in the physical area.

As discussed above, the priority of a route can be one factor used by the route density analyzer 252 to weight the effect of a route on the density value for a sector. Time can be another factor used when processing historical route information. For example, it may be desirable to give lower weight to historical route information from one week ago than the historical route information from one day ago. In such implementations, as the route density analyzer 252 processes the historical route information, an amount contributed to the density value for a given sector may be weighted to reduce the influence of a historical value. The reduction amount may be inversely proportional to the magnitude of the age of the historical value.

The mapping server 250 may also obtain information about the mobile drive unit 120 and/or tasks associated with the mobile drive unit from the management device 115. For example, the management device 115 may provide the current location and/or operational status of a mobile drive unit. This information may be used to generate density information and/or additional graphic output to provide guidance.

The mapping server 250 may also include a presentation engine 254. The presentation engine 254 may be configured to generate and cause presentation of traffic density based information based on the density information generated by the route density analyzer 252 and/or stored in the density data storage device 256. For example, generating the traffic density map may include assigning a graphic display element to each sector based on the generated traffic density value for the sector. The graphic display element may include color, an icon, an emoji, or similar visually perceptible indicator of density. The graphic display elements for each sector may be combined to generate a new image that can be presented independent of a map image of the workspace or as a semi-transparent overlay image to the map image of the workspace. In some implementations, the traffic density map may be a tiled map presented via a user interface of an application such as a web browser or dedicated client application. The application may receive instructions to render the tiles of the traffic density map at specific locations on the user interface. The user interface may include a slider or other control that enables the user to see how the traffic density will change over some window of time. For example, the map may initially represent the traffic density over the next minute, but the user may plan to perform a task in the area for the next two minutes. The user interface may include a control to receive a selection of a future time. Thus, the user can effectively jump ahead to see what the traffic density will look like at the future time (e.g., 2 minutes from the present time).

The instructions may be provided in a markup language such as HTML. In some implementations, each sector may correspond to a tile within the traffic density map. Presentation of the traffic density based guidance information may include other or additional perceivable outputs such as adjusting lighting elements (e.g., color, hue, brightness), projecting the generated information, adjusting audible cues (e.g., changing tempo or mood of a music track playing as a worker moves through the workspace to in correlation with the traffic density, or selecting audio tracks with content corresponding to the traffic density (e.g., a vocal track saying, "Looking good" may be played when nearing or traversing low density areas while a vocal track saying "Danger" may be played when nearing or traversing high density areas)). Suggested routes may be displayed in addition to, or instead of, the traffic density information such as in embodiments where the user's starting position and destination are known. In some implementations, the map may be continuously updated to show the location of the user on the map.

Figures 3A, 3B, 3C:
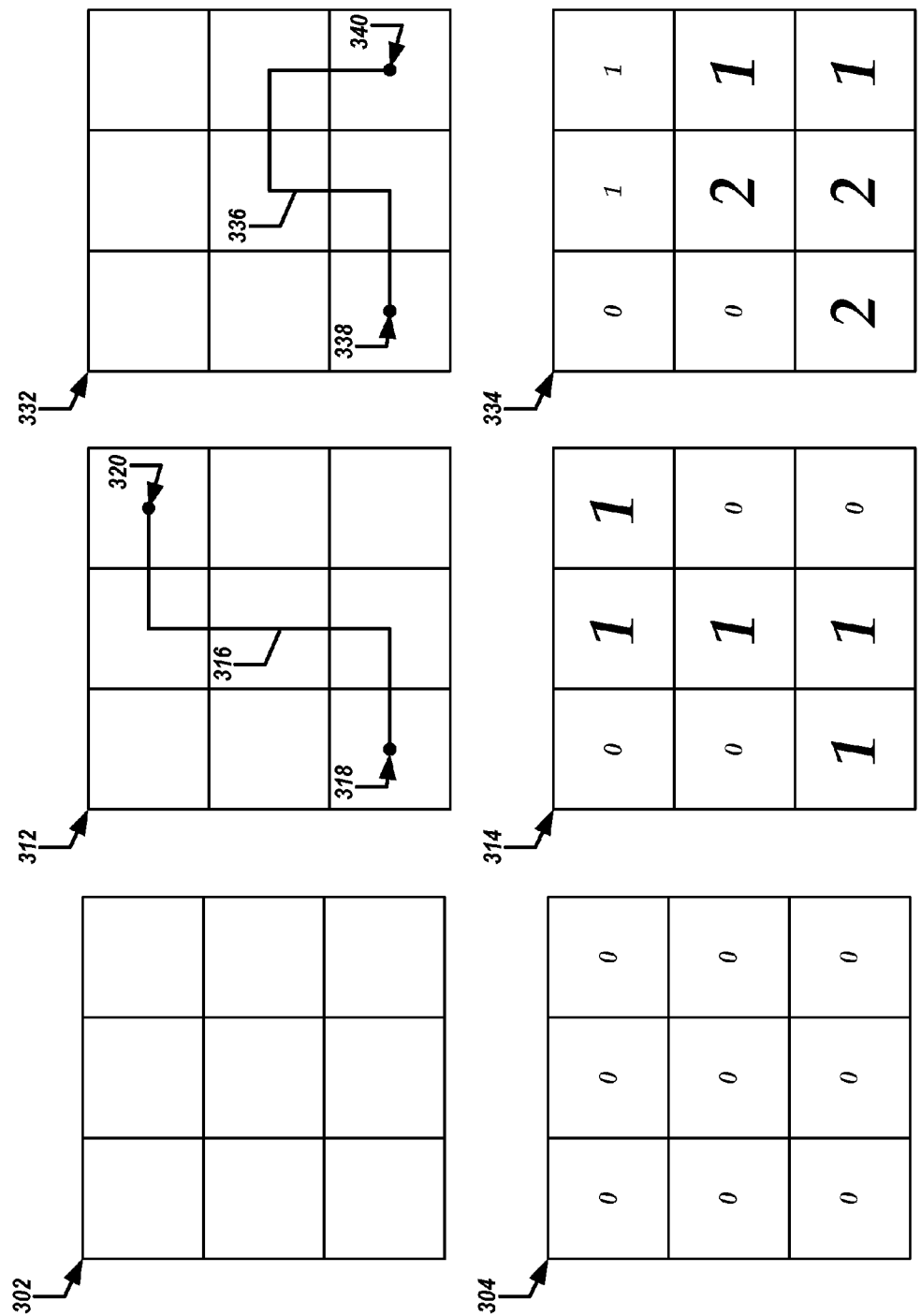
FIG. 3A is a pictorial diagram depicting an illustrative traffic density map where no robot routes are mapped.
FIG. 3B is a pictorial diagram depicting an illustrative traffic density map for a first route.
FIG. 3C is a pictorial diagram depicting the illustrative traffic density map of FIG. 3B including a mapping for a second route.

FIG. 3A is a pictorial diagram depicting an illustrative traffic density map where no robot routes are mapped. The workspace is partitioned into a map 302 including three rows and three columns where each cell represents a sector of the workspace. As discussed above, the partitioning of the workspace may be dynamically performed. Furthermore, the map 302 may include additional or fewer sectors. Because no routes have been analyzed yet, a density map 304 includes an empty value (e.g., 0) indicating that no routes pass through the sectors of the map 302. The density map 304 may be a logical data structure that can be used to generate a traffic density map, such as the traffic density map 204 shown in FIG. 2. To generate the traffic density map from the density map 304, the value of each sector of the density map 304 may be mapped to a color.

FIG. 3B is a pictorial diagram depicting an illustrative traffic density map for a first route. A second map 312 is shown in FIG. 3B. The second map 312 covers the same area as the map 302 in FIG. 3A. However, the second map 312 includes a representation of a first route 316 for a mobile drive unit. The first route 316 includes endpoints 318 and 320 representing terminal points of the first route 316. The first route 316 identifies a planned path the mobile drive unit will take through the workspace to complete a task. The planned path corresponds to sectors of the second map 312 traversed the first route 316.

A second density map 314 is shown in FIG. 3B. The second density map 314 includes five sectors with incremented counts to indicate the first route 316 traversed by the mobile drive unit. The sectors having incremented counts are shown with a larger font than the sectors that were not covered by the first route 316. The remaining sectors that are not entered by the first route 316 retain the empty (e.g., 0) value.

FIG. 3C is a pictorial diagram depicting the illustrative traffic density map of FIG. 3B including a mapping for a second route. A third map 332 is shown in FIG. 3C. The third map 332 covers the same area as the map 302 in FIG. 3A. However, the third map 332 includes a representation of a second route 336 for a mobile drive unit. The second route 336 includes endpoints 338 and 340 representing terminal points of the second route 336. The second route 336 identifies a planned path the mobile drive unit will take through the workspace to complete a task. The planned path corresponds to sectors of the third map 332 traversed by the second route 336.

A third density map 334 is shown in FIG. 3C. The third density map 334 includes five sectors with incremented counts to indicate the second route 336 traversed by the mobile drive unit. The sectors having incremented counts include counts shown with a larger font than unchanged sector counts. Because the route 316 and the second route 336 each traverse three sectors, the accumulated count for these three sectors in the third density map 334 is shown as 2.

Additional routes may be analyzed to continue identifying which sectors are traversed by each route. As shown in FIGS. 3B and 3C, the counts are incremented in a uniform fashion (e.g., increments of 1). In some implementations, the counts may be incremented using dynamically assessed amounts. For example, if a route is planned for a high priority task, such as a rush delivery, the sectors traversed by the route may be incremented more than a lower priority traversal of the sector. This allows the density map to more accurately reflect the density for a given sector and the impact an interruption of traffic for the sector would have on the overall performance of the inventory system.

To further enhance the density map, historical routes may be analyzed. A historical route may cause the count for the sectors traversed by the historical route to be incremented less than a planned route. This allows the planned route to have stronger representation in traffic density map than historical routes. A historical route may contribute to the count for a sector as a function of time. For example, the further from the current time the historical route was planned or executed, the lower weight the historical route is given as a contribution to the count for a sector traversed by the historical route.

It may be desirable to limit the number of routes analyzed. For example, the traffic density map may be useful to a worker who completes tasks in 15 minutes. Once the task is complete, the traffic density may no longer be needed. However, the management device may plan routes for longer than 15 minutes. In such implementations, the route density analyzer may obtain planned routes within an estimated time period. The expected time period may be identified based on a task assigned to a human worker. The task may identify a distance to be traveled and provide estimated speeds for performing the task. In some implementations, the expected time period may be predetermined based on characteristics of the inventory system such as average task times. The time period may start at least at a time the request for a traffic density map is received and last for the estimated time to complete the task. In some implementations, buffer time may be added to the estimated time to account for small variations to the estimate. The amount of buffer time may be specified in as a configurable value in a traffic density mapping configuration.

Figure 4:
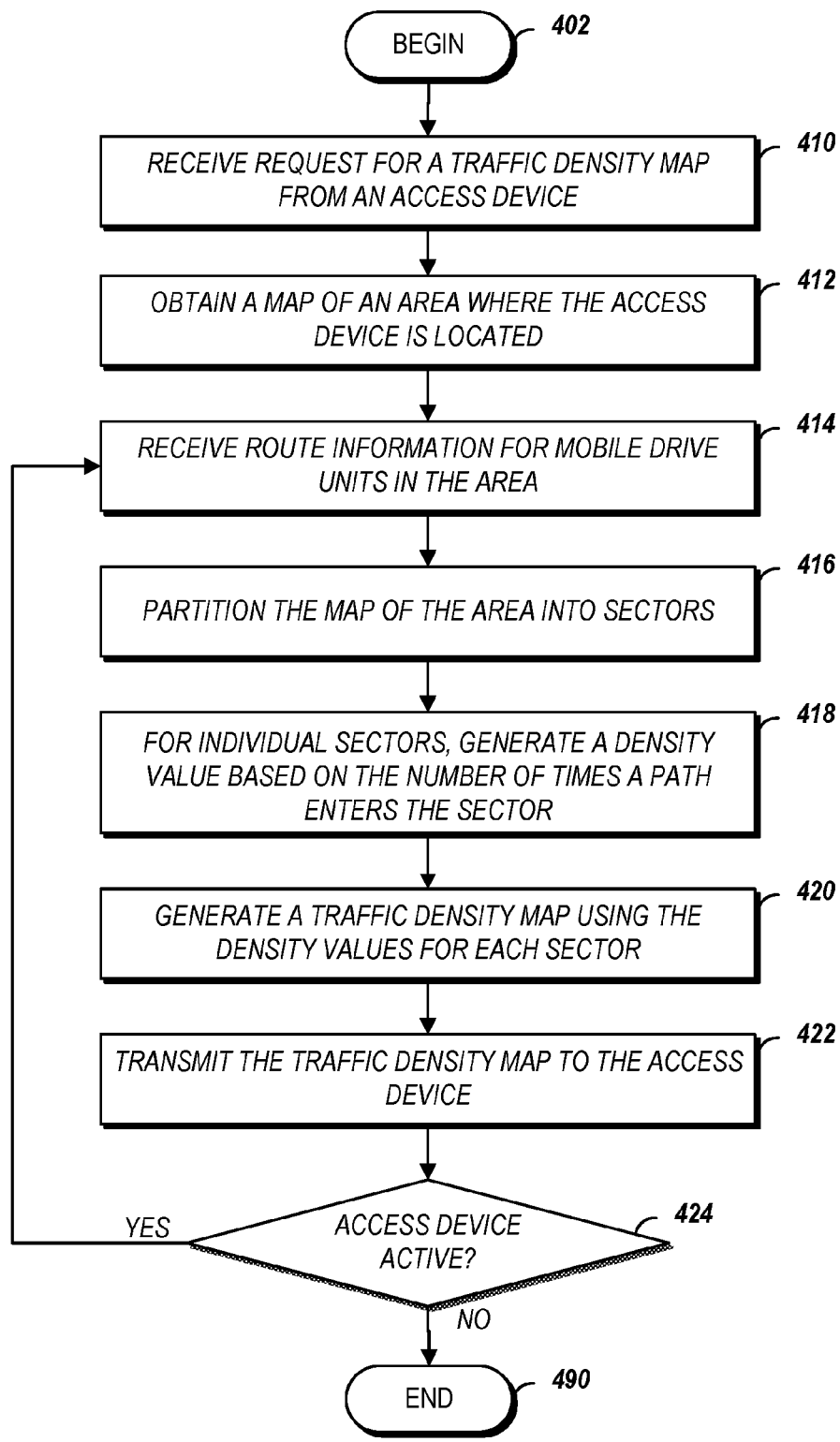
FIG. 4 is a process flow diagram of an illustrative method of generating robotic traffic density based guidance information.

FIG. 4 is a flow diagram of an illustrative method of generating robotic traffic density based guidance information. The process 400 shown in FIG. 4 illustrates how a traffic density map may be generated and provided to an access device such as the access device 202 shown in FIG. 2. The process 400 shown in FIG. 4 may be implemented in whole or in part by a mapping server such as the mapping server 250 shown in FIG. 2 and discussed above. Some or part of the process 400 shown in FIG. 4 may be implemented by or in conjunction with a management device such as the management device 115 shown in FIG. 1 and discussed above. Some or part of the process 400 shown in FIG. 4 may be implemented by or in conjunction with a route planning server such as the route planning server 274 shown in FIG. 2 and discussed above. Some or part of the process 400 shown in FIG. 4 may be implemented by or in conjunction with an access device or other device presenting the traffic density map such as the access device 202 shown in FIG. 2.

The process 400 begins at block 402. At block 410, a request for a traffic density map may be received from an access device. Receiving the request for the traffic density map may include establishing a communication channel between a mapping server and the access device. The communication channel may be a wired or wireless communication channel suitable for transferring messages in a machine readable format. The request may include an identifier for the access device, identifier for a worker using the access device, location information for the access device, and/or information about a task to be performed by the worker using the access device. The information about the task may include a task identifier that can be used to look up the locations visited as part of the task. The information about the task may include starting and destination locations within the workspace visited while performing the task.

Receiving the request for the traffic density map at block 410 may include parsing received messages to determine a message type. The mapping server may receive a variety of messages. To ensure traffic density maps are generated when needed, the mapping server may monitor the message type for received messages. If the message type is associated with traffic density map request, the process 400 continues to block 412.

At block 412, a map of an area where the access device is located may be obtained. In some implementations, there may be one map for the workspace. In some implementations, the workspace may be larger than the physical area in which the access device and/or worker will be operating. In such instances, it may be desirable to obtain a map representing that portion of the workspace where the access device and/or worker will be operating. The physical area may be identified using information included in the request received at block 410 such as the location information for the access device or task information. Obtaining the map may include transmitting a request to a map data server for map data and receive a response message including the requested map data.

At block 414, route information for mobile drive units in the physical area may be received. The route information may be received passively or actively by the mapping server as discussed above. The route information may be received from a route planning server included in the inventory system. In an active arrangement, receiving the route information may include transmitting a request to the route planning server. The request may include information identifying the physical area and/or the duration of the task. These parameters can reduce the quantity of route information received by the mapping server. The request may also include a parameter to control whether historical route information should be provided. For example, if the mapping server is processing a low number of requests for traffic density maps, the mapping server may have the resources available to analyze both planned and historical route information to provide the requested traffic density map in a timely fashion. In such instances, the mapping server may include a parameter requesting historical and planned route information. However, if the mapping server is processing a higher number of requests, the mapping server may not have the resources available to process historical and planned route information. In such instances, the mapping server may include a parameter requesting only planned route information.

At block 416, the map of the physical area may be partitioned into sectors. As discussed above, the partitioning may be a logical partitioning of the physical area into uniform sectors. In some implementations, the partitioning may be dynamic based on resources available to the mapping server. For example, if the mapping server is processing a low number of requests, the number of sectors may be higher than when the mapping server is processing a higher number of requests. Partitioning the sectors may include generating a set of locations each location representing a sector. The location may be identified using coordinates, such as bounding box coordinates, point square coordinates where a center point and width of a square are specified, point circle coordinate where a center point and radius of a circle are specified, or other location identifier. In alternative embodiments, the traffic density map may be generated without partitioning the physical area into sectors.

At block 418, using the partitioned map from block 416 and the route information from block 414, for each sector, a density value based at least in part on the number of times a path enters the sector may be generated. The density value may be generated by comparing location information for the route to the set of sectors. If the location information for the route traverses one of the sectors, the density value for the sector may be incremented. In some implementations, the density value may represent a count of the number of times a path enters a sector. As discussed above, the amount that the density value for a sector is incremented may be standard for all planned routes. In some implementations, the amount may be variable based on one or more factors of the inventory system. One factor may be the route for the mobile drive unit. For example, the route may be a high priority route between locations designated as high throughput locations. Accordingly, the sectors traversed by a high priority route may increase the density value more than a low priority route. Another factor may be items carried by the mobile drive unit. For example, the mobile drive unit may be carrying sensitive items that need to be moved to a destination location carefully and efficiently. The route for such mobile drive units may be designated as higher priority than other mobile drive units. The sensitivity of an item may be determined by accessing an item data storage system that maintains locations of where particular items are stored along with sensitivities (e.g., fragile, perishable, hazardous, etc.) related to the storage or movement of the item.

Another factor may be the operational state of the mobile drive unit such as expected speed of the mobile drive unit at a given position in the route. For example, if a mobile drive unit is moving at a high rate of speed, an interruption of the mobile drive unit at that time presents a more substantial interruption to the mobile drive unit than an interruption when the mobile drive unit is stationary or moving more slowly. As one example, the resources expended by the mobile drive unit to decelerate and then resume the route may be greater than the resources expended by a mobile drive unit interrupted while in an idle state.

Another factor may be the operational status of the inventory system. For example, users may log into inventory stations, such as the inventory station 150 shown in FIG. 1. As an inventory station becomes active, the traffic (both human and robotic) may increase. Accordingly, it may be desirable to weight the locations near active inventory stations higher than the locations around inactive inventory stations.

In some implementations, machine learning may be included to generate weights and/or traffic density information for the sectors. For example, a neural network may be provided where each node represents a sector and connections in the neural network may be used to model physical connections between sectors. Historical route information may be modeled to identify how much longer a route through specific sectors took than expected when the route was initially planned. In this way, a prediction may be generated by the model as to how likely an interruption may occur and, in some instances, what the magnitude of interruption may be. The neural network may receive logged in stations, number of humans, number of robots, a route, a destination, or other characteristic of the inventory system. The output of the neural network may include a predicted density for one or more sectors, a weight for one or more sectors, or the like. The weight may be provided for a given route (e.g., mobile drive unit) and/or for the inventory system as a whole.

As discussed above, the route information received at block 414 may include planned route information for routes that are going to be taken by mobile drive units in the future. The route information received at block 414 may also or alternatively include historical route information. When analyzing historical route information, the effect on the density value for a sector for a historical route may be weighted less than the effect of a planned route. This allows the planned routes to have a higher impact on the density value than the historical routes. The weighting may be based on elapsed time from the time of the historical route to the current time. The weighting may include the priority of the historical routes as discussed above.

Generating the density values at block 418 may include storing the density values for each sector in a density data storage device such as the density data storage device 256 shown in FIG. 2. Storing the density values in the density data storage device allows the mapping server to generate composite density values for the sectors included in an area.

For example, at three different times, density values for a set of sectors may be generated. The generating at block 418 may include a composite density value formed by combining the density values for respective sectors from the three different times. This can be another way to include traffic density for historical routes without needing to retrieve and re-analyze the historical route information. Examples of combinations to generate a composite density value include: a time weighted average or moving average of the density values for each sector over the different time periods.

At block 420, a traffic density map may be generated. The traffic density map may be generated using the density values for each sector generated at block 418. In some implementations, the mapping server may include a look up table mapping density value ranges to associated display colors. If a sector is associated with a density value in a given density value range, the traffic density map may adjust the color of sector within the traffic density map to the associated display color. In some implementations, density value ranges may be associated with graphics such as icons or emojis. In such implementations, the graphic associated with the density value range may be presented in the sector represented on the traffic density map. In some implementations, the traffic density map may additionally or alternatively display all or some of the planned routes used to generate the traffic density values.

In some implementations, generating the traffic density map may include generating an image file. The image file may be formed by combining blocks of image data corresponding to the sectors and the associated indication of traffic density (e.g., graphics, color, text) for the sector. The image file may be semi-transparent to provide a multi-layer display wherein the traffic density map can be overlaid with a map of the physical area.

In some implementations, the request received at block 410 may include location information for the access device and a destination location for the access device. In such implementations, generating the traffic density map may include suggesting a route from the location of the access device to the destination location. To identify the suggested route, a sequence of sectors having the lowest density may be identified from the location of the access device to the destination location. The suggested route may be included as part of the traffic density map or as an additional graphics layer for presentation via the access device. The access device may provide guidance for traversing the suggested route such as how fast to move along the suggested route. The guidance may be provided as one or more of audio, visual, textual, or haptic outputs perceivable by the user.

At block 422, the traffic density map may be transmitted to the access device. Transmitting the traffic density map may include transmitting the image file representing the traffic density map. In some implementations, a reference to the traffic density map may be provided to the access device. In such implementations, the access device can use the reference to obtain the traffic density map such as from a network location identified by the reference. In some implementations, the traffic density map may be transmitted to a display system (not shown). The display system may provide a presentation of the traffic density map within the workspace. For example, a projector may receive the traffic density map and display the map on a surface within the workspace. In some implementations, the projector may illuminate a portion of the floor of the workspace. The color of the illumination may correspond to the density for respective sectors. In some implementations, the lighting system within the workspace may be adjusted to indicate traffic density. For example, in areas where there is low traffic density, the lights may be adjusted to emit light having a green hue while areas with high traffic density may be adjusted to emit light having a red hue.

At block 424, a determination is made as to whether the access device is actively using the traffic density map. For example, the access device may close communication channels with the mapping server or may have completed a task. In such instances, the determination at block 424 is negative and the process 400 ends at block 490. It will be appreciated that the process 400 may be repeated in response to a subsequent request for a traffic density map.

Returning to block 424, if the determination is affirmative and the access device is actively using the traffic density map, the process 400 may return to block 414 to obtain additional/updated route information as described above. In this way, the traffic density map may be updated to reflect any changes or additional routes planned. For example, three times per second, a request for updated information may be transmitted.

Figure 5:
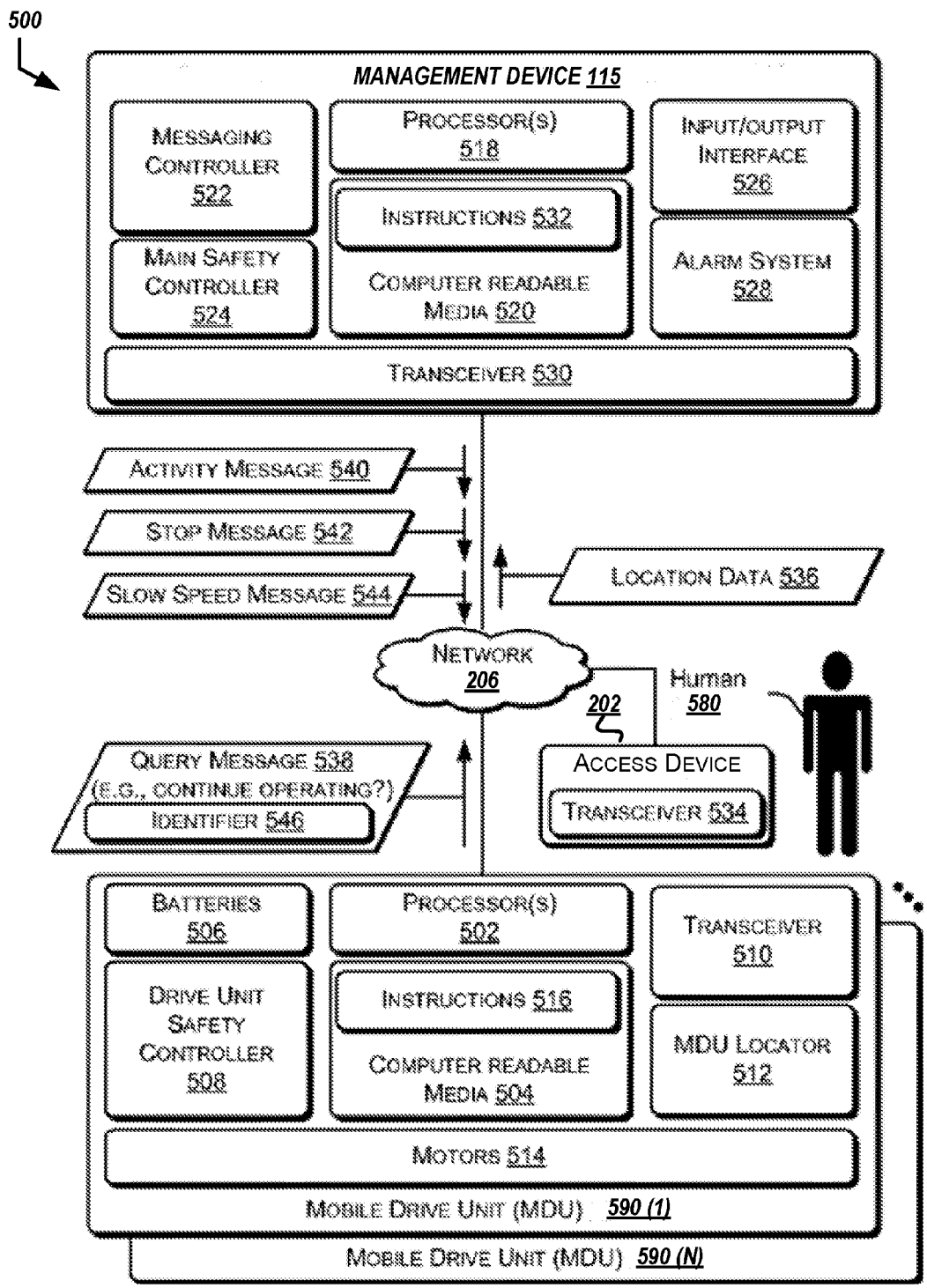
FIG. 5 is an illustrative architecture in which an activity message may be transmitted from a management device to one or more mobile drive units.

FIG. 5 is an illustrative architecture in which an activity message may be transmitted from a management device to one or more mobile drive units. The architecture 500 may include mobile drive units 590(1) through 590(N) (where N>1) that are communicatively coupled to the safety management device 115 via a network 206. The network 206 may include one or more networks, including a wired network, a wireless network, or both. The network 206 may include technologies such as Ethernet, Data Over Cable Service Interface Specification (DOCSIS), Fiber Optic cable, WiFi® (e.g., 802.11), BLUETOOTH®, near field communication (NFC), Global System for Mobile (GSM), Long Term Evolution (LTE), Universal Mobile Telephone Service (UMTS), Code Division Multiple Access (CDMA), another type of network technology, or any combination thereof.

Each mobile drive unit 590 may include one or more processors 502, one or more memory devices (e.g., computer readable media 504), one or more batteries (or other power sources) 506, a drive unit safety controller 508, a transceiver 510, a mobile drive unit (MDU) locator 512, one or more drive mechanisms, such as motors 514, or any combination thereof. The computer readable media 504 may include non-transitory media to store instructions 516 that are executable by the processors 502 to perform the various functions of the mobile drive unit 590. The drive unit safety controller 508 may govern the behavior of the mobile drive unit 590 to prevent the mobile drive unit 590 from causing injury to a human 580. For example, the drive unit safety controller 508 may detect (e.g., via a sensor) that an object is obstructing its planned route. The drive unit safety controller 508 may cause the mobile drive unit 590 to stop or adjust the speed of the motor to avoid colliding with the object. The drive unit safety controller 508 may cause the mobile drive unit 590 to emit an alert (e.g., sound or light) to warn the object. The drive unit safety controller 508 may initiate modification of the scheduled route. The modification may be performed by the mobile drive unit 590 or via messaging with the management device 115. The transceiver 510 may be capable of transmitting and receiving messages using the network 206. The mobile drive unit locator 512 may be used to transmit a location of each mobile drive unit 590(1) through 590(N) to the management device 115 using the transceiver 510.

The management device 115 may include one or more processors 518, one or more memory devices, such as computer readable media 520, a messaging controller 522, a main safety controller 524, an input/output interface 526, an alarm system 528, a transceiver 530, or any combination thereof. The computer readable media 520 may include instructions 532 that are executable by the processors 518 to perform the various functions of the management device 115. The messaging controller 522 may determine which particular messages are to be sent to particular mobile drive units. The main safety controller 524 may provide various safety instructions including determining when to instruct a mobile drive unit to stop performing any physical activity, when to reduce speed, when to navigate away from a human, etc. The input/output interface 526 may include various input and output devices, such as a keyboard a mouse, a trackball, a display device, other input/output devices, and the like. The alarm system 528 may cause an alarm to sound or be displayed in an area, such as the workspace 170, to alert human(s) that are in the physical area to exit the physical area, etc. The transceiver 530 may be used to send messages to and receive messages from one or more of the mobile drive units and communicate with a mapping server (not shown in FIG. 5).

The human 580 may be associated with the access device. The access device may be worn or carried by the human 580. For example, the access device 202 may be incorporated into an identification badge, a hard hat, safety glasses, work boots, protective suit, or any other item that can be worn or carried by the human 580. The access device 202 may include a transceiver 534 to send messages to or receive messages from the management device 115, a mobile drive unit, the mapping server 250, or some combination thereof. For example, the transceiver 534 may send a message that includes location data 536 to enable the management device 115, the mobile drive units, or both to determine a location of the human 580. The access device 202 may also include a display for presenting a traffic density map generated by the mapping server 250.

In some implementations, one or more of the mobile drive units 590(1)-590(N) may send, at a predetermined interval (e.g., every M milliseconds, where M>0) a query message 538 (e.g., "continue operating?") to the management device 115. In response to receiving the query message 538, the management device 115 may send a response message to individual ones of the mobile drive units 590(1)-590(N). For example, when the management device 115 determines that no human is present, the response message may be an activity message 540 that instructs a mobile drive unit to continue performing a set of activities. When the management device 115 determines that a human is present, the response message may be a stop message 542 that instructs a mobile drive unit to temporarily (e.g., while the human 580 is present) stop performing any physical activities, or the response message may be a slow speed message 544 that instructs a mobile drive unit to temporarily (e.g., while the human 580 is present) reduce a speed of the mobile drive unit when navigating to a new location. Other response messages when a human is present are also possible, e.g., a response message that instructs a mobile drive unit to navigate away from the human 580, or combinations of the various response messages when a human is present.

The activity message 540 may be accompanied by a route change for the associated mobile drive unit. This route change information may be detected by the mapping server 250 as discussed above any used to update a traffic density map.

The query message 538 may include an identifier 546 that uniquely identifies each query message that the management device 115 receives from mobile drive units. For example, the identifier 546 may include an identity of the mobile drive unit 590 that is sending the query message 538 and a timestamp that includes a date and time that the query message 538 was created. If the query message 538 includes the identifier 546, the response message (e.g., one of the messages 540, 542, or 544) sent by the management device 115 may include the identifier 546 to identify the response message as corresponding to a particular query message. If a particular mobile drive unit of the mobile drive units 106 fails to receive a response message that includes the identifier 546 of a most recently sent query message, the particular mobile drive unit may stop performing any physical activities until a response message including the identifier 546 is received, and/or the management device 115 instructs the particular mobile drive unit otherwise.

In some implementations, the mobile drive units may not send the query message 538. When no human is detected, the management device 115 may periodically broadcast (e.g., send) the activity message 540 to the mobile drive units to instruct each of the mobile drive units to perform (or continue performing) a set of activities. In response to detecting the presence of the human 580, the management device 115 may stop sending the activity message 540 to the mobile drive units and/or periodically broadcast the stop message 542, the slow speed message 544 or other appropriate messages when a human is present. After determining that the human 580 has left the physical area in which the mobile drive units were performing activities, the management device 115 may resume broadcasting the activity message 540 to the mobile drive units to instruct the mobile drive units to resume performing the set of activities and/or perform a different set of activities.

As the stop message 542 or the slow speed message 544 may also affect the planned routes for a mobile drive unit, stop message 542 or slow speed message 544 may be detected by the mapping server 250 as discussed above any used to update a traffic density map to account for the updated route for the mobile drive units that adjusted their speed.

If one of the mobile drive units, such as the mobile drive unit 590(1), fails to receive the activity message 540, the mobile drive unit 590(1) may cease performing any physical activity until the mobile drive unit 590(1) receives the activity message 540. For example, in situations where the network 206 malfunctions, the mobile drive units may move to a location where commands from the management device 115 cannot be received, or other situations where the mobile drive units do not receive the activity message 540, the mobile drive units may cease performing any physical activity until the activity message 540 is received, and/or until instructed otherwise. Thus, the activity message 540 may serve as a "heartbeat" such that if the mobile drive units do not detect the heartbeat (e.g., receive the activity message 540), and then the mobile drive units may perform a default action, such as ceasing to perform any physical activity. The mobile drive units may resume performing a set of actions when the mobile drive units resume periodically receiving the activity message 540.

Thus, the mobile drive units may perform a set of activities in the workspace 170 when they periodically receive the activity message 540 from the management device 115 instructing them to perform the set of activities. If the management device 115 detects the human 580 in the workspace 170, the management device 115 may determine a distance of each of the mobile drive units from the human 580 and send the stop message 542 or the slow speed message 544 (or other messages) to selected mobile drive units, such as those within a predetermined distance of the working zone 105 of the human 580. Some mobile drive units may cease performing any physical activity if the mobile drive units do not periodically receive the activity message 540.

Figure 6:
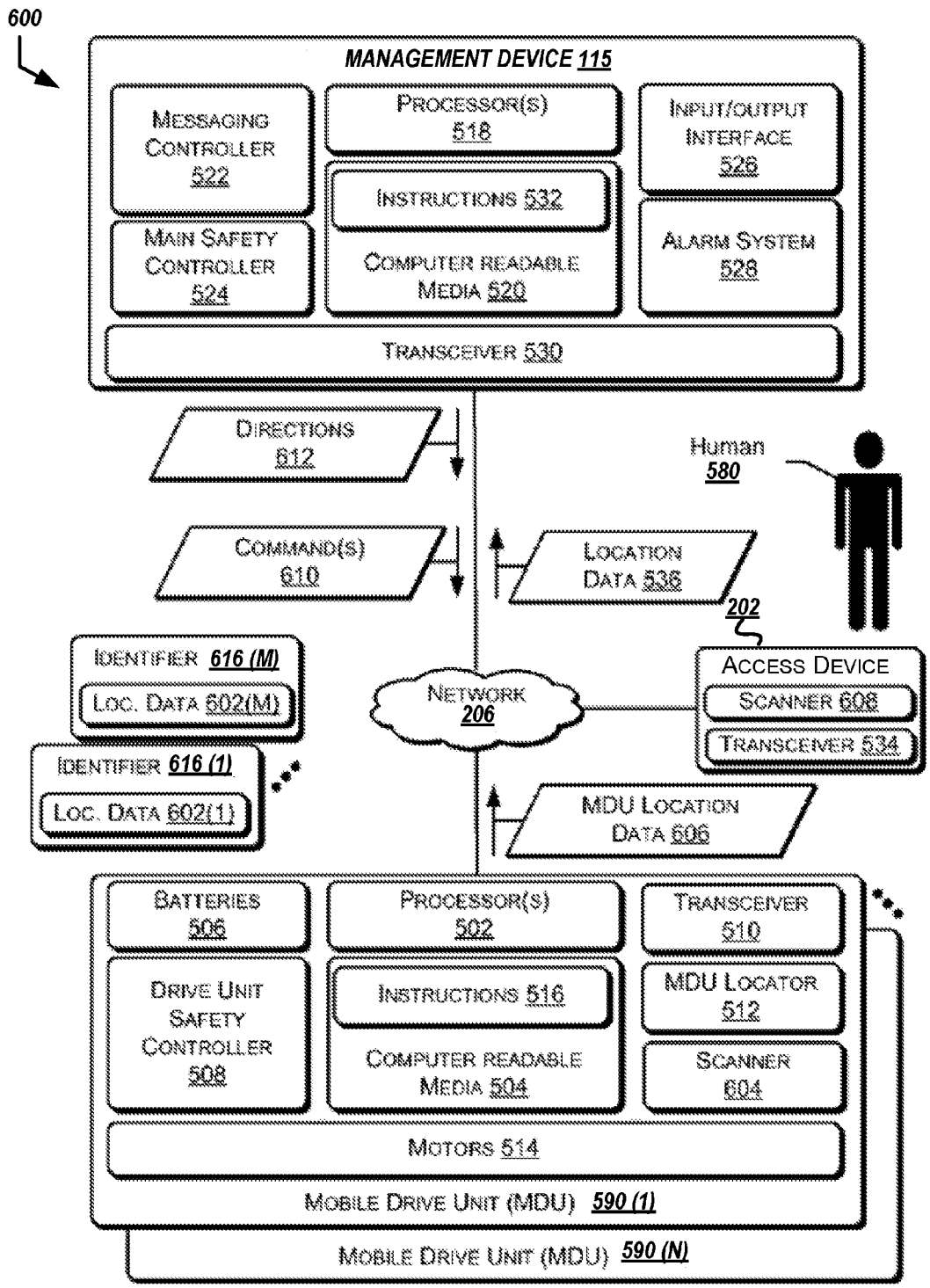
FIG. 6 is an illustrative architecture that includes using identifiers to determine location information for entities within a workspace.

FIG. 6 is a pictorial diagram showing an illustrative environment for operating mobile drive units. The environment 600 includes identifiers (e.g., fiducial markers) to determine location information for mobile drive units. In some implementations, identifiers (e.g., fiducial markers), such as identifiers 616, may be used to determine a location of one or more of the mobile drive units (e.g., mobile drive units 590(1) to 590(N), where N is greater than 1). For example, the identifiers 616(1) to 616(M), where M is greater than 1, may be placed at various locations in an area (e.g., the workspace 170 of FIG. 1). Each of the identifiers 616 may include or be associated with corresponding location data 602(1) to 602(M). An identifier 616 may comprise an optical code (e.g., a bar code, a two-dimensional bar code (such as a "quick response" or QR® code), or other type of scannable code) that can be read using an imaging device, such as an optical scanner. Alternatively, an identifier 616 may include a radio frequency identifier (RFID) tag, near field communication (NFC) tag or the like that stores information thereon that can be transmitted to, or read by, other devices. In some cases, an identifier 616 may include location information, such as the location data 602 that identifies a location within an area corresponding to each of the identifiers 616.

Each of the mobile drive units 590(1) through 590(N) may include an imaging device, such as a scanner 604, that is capable of scanning (e.g., reading) the identifiers 616. Each time a particular one of the mobile drive units 590 passes by or over one of the identifiers 616, the scanner 604 may scan one of the identifiers 616 and send a message 606 including mobile drive unit location data to a management device 115. For example, the mobile drive unit location data included in the message 606 may include a unique identifier obtained when the mobile drive unit scans an identifier. The management device 115 may determine a location of one or more of the mobile drive units 590 after receiving the message 606. For example, the mobile drive unit 590(1) may send a message that includes the information uniquely identifying the identifier 616(1). The management device 115 may receive the mobile drive unit the message 606 including the information uniquely identifying the identifier 616(1), determine that the information uniquely identifying an identifier 616 is associated with the identifier 616(1), and determine a location of the identifier 616(1) to determine the location of mobile drive unit 590(1). The management device 115 may be similar to the management device 115 shown in FIG. 1 or 5.

Each human, such as the human 580, in an area (e.g., the workspace 170) may wear or carry the access device 202 that may include an imaging device, such as a scanner 608, that is capable of scanning (e.g., reading) the identifiers 602. Each time the human 580 passes near one of the identifiers 616, the scanner 608 may scan the location data 602 of the identifier 616 and send a location data message 536 to the management devices 115. For example, the location data message 536 may include a unique identifier provided by one of the identifiers 616. The management device 115 may determine a location of the human 580 after receiving the location data message 536. For example, the human 580 may send the location data message 536 that includes the location data 602(1) associated with the identifier 616(1). The management device 115 may receive the location data message 536, determine that the location data 602(1) is associated with the identifier 616(1), and determine a location of the identifier 616(1) within the workspace 170 to determine the location of the human 580. The location data message 536 may also be transmitted to the mapping server 250 to facilitate generation of a traffic density map for the specific location of the human 580.

The scanners 604, 608 (e.g., imaging devices or wireless communication devices) may be designed to scan the identifiers 616. For example, when the identifiers 616 are optically scannable or readable, the scanners 604, 608 may be cameras or another type of imaging device. When the identifiers 616 are RFID tags, the scanners 604, 608, may be RF scanners (e.g., RFID readers).

Thus, identifiers, such as fiducial markers, where each fiducial marker has a unique corresponding identifier, may be used to determine a location of the mobile drive units. The management device 115 may send one or more command messages 610 instructing one or more of the mobile drive units. A command message may instruct a mobile drive unit to cease performing the set of activities. A command message may instruct a mobile drive unit to move to a new location, cease performing any activity, navigate away from a location, move an inventory holder from a first location to a second location, or any combination thereof. As the commands 610 are transmitted to the mobile drive units, the mapping server may actively or passively detect route information for the mobile drive units. This route information may be used to generate and/or update traffic density maps.

Additional examples structures and techniques for coordinating the actions of mobile drive units with a management device are described in U.S. patent application Ser. No. 14/472,717, filed on Aug. 29, 2014 and titled "SAFETY COMPLIANCE FOR MOBILE DRIVE UNITS," the entire disclosure of which is herein incorporated by reference.

Figure 7:
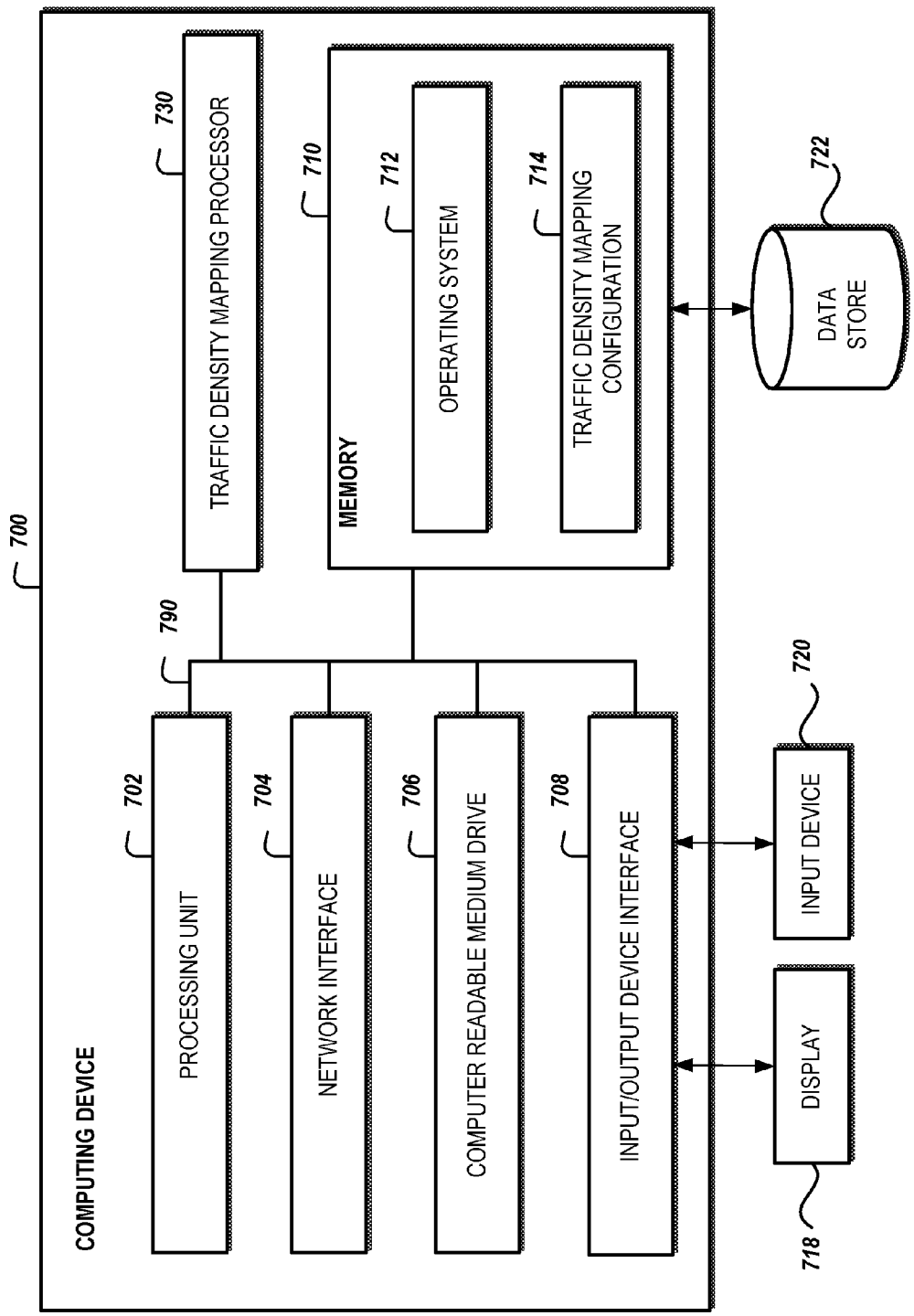
FIG. 7 shows a functional block diagram of an example computing device for generating robotic traffic density based guidance information.

FIG. 7 shows a functional block diagram of an example computing device for generating robotic traffic density based information. The computing device 700 may be configured to execute some or all of the processes and embodiments described herein. For example, computing device 700 may be implemented by any computing device, including a telecommunication device, a cellular or satellite radio telephone, a laptop, tablet, or desktop computer, a digital television, a personal digital assistant (PDA), or by a combination of several such devices, including any in combination with a network-accessible server. The computing device 700 may be implemented in hardware and/or software using techniques known to persons of skill in the art. The disclosed processes for generating the traffic density based information may alternatively be distributed across a system of two or more distinct computing devices.

The computing device 700 can include a processing unit 702, a network interface 704, a computer readable medium drive 706, an input/output device interface 708 and a memory 710. The network interface 704 can provide connectivity to one or more networks or computing systems. The processing unit 702 can receive information and instructions from other computing systems or services via the network interface 704. The network interface 704 can also store data directly to memory 710. The processing unit 702 can communicate to and from memory 710. The input/output device interface 708 can accept input from the optional input device 722, such as a keyboard, mouse, digital pen, microphone, camera, etc. In some embodiments, the optional input device 722 may be incorporated into the computing device 700. Additionally, the input/output device interface 708 may include other components including various drivers, amplifier, preamplifier, front-end processor for speech, analog to digital converter, digital to analog converter, etc.

The memory 710 may contain computer program instructions that the processing unit 702 executes in order to implement one or more embodiments. The memory 710 generally includes RAM, ROM and/or other persistent, non-transitory computer-readable media. The memory 710 can store an operating system 712 that provides computer program instructions for use by the processing unit 702 in the general administration and operation of the computing device 700. The memory 710 can further include computer program instructions and other information for implementing some or all of the features described. For example, in one embodiment, the memory 710 includes a traffic density mapping configuration 714 that provides configuration values to adjust the state of the computing device 700 to generate traffic density maps. For example, the traffic density mapping configuration 714 may identify how often to poll a route planning server for new or updated route information. The traffic density mapping configuration 714 may include display rules for various density values. The display rules may be implemented a look up table of density value ranges and corresponding display element(s). A traffic density mapping processor 730 may be included in the computing device 700 to coordinate the generation of the traffic density maps. The traffic density mapping processor 730 may be configured to perform the processes such as the process 400 shown in FIG. 4.

The memory 770 may also include or communicate with one or more auxiliary data stores, such as a data store 724. The data store 724 may electronically store data regarding traffic density maps such as suggested routes, historical sector density values, partitioned maps, and the like. A bus 790 may be included in the computing device 700 to allow the elements included in the computing device 700 to exchange data (e.g., messages).

In some embodiments, the computing device 700 may include additional or fewer components than are shown in FIG. 7. For example, a computing device 700 may include more than one processing unit 702 and computer readable medium drive 706. In another example, the computing device 700 may not include or be coupled to an input device 722, include a network interface 704, include a computer readable medium drive 706, include an operating system 712, or include or be coupled to a data store 724. In some embodiments, two or more computing devices 700 may together form a computer system for executing features of the present disclosure. Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations, or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a mobile drive unit, management device, or other hardware included in an inventory system. The mobile drive unit, management device, or other hardware included in an inventory system may include a digital signal processor (DSP), an application specific integrated circuit (ASIC), a field programmable gate array (FPGA), a microprocessor, a controller, microcontroller, or other programmable logic element, discrete gate or transistor logic, discrete hardware components, or any combination thereof. Devices used to implement the inventory system are specially designed to perform the traffic density guidance features described herein. One or more of the devices included in the inventory system may include electrical circuitry configured to process specific computer-executable to perform one or more of the features described herein. In embodiments where a device includes a FPGA or similar programmable elements, the inventory system (or a device included therein) may provide one or more of the features described processing without processing computer-executable instructions but instead by configuring the FPGA or similar programmable element to perform the recited features. Although described herein primarily with respect to digital technology, aspects of the inventory system may also include primarily analog components. For example, some or all of the traffic density guidance features described herein may be implemented in analog circuitry or mixed analog and digital circuitry.

The elements of a method, process, routine, or algorithm described in connection with the embodiments disclosed herein can be embodied directly in inventory system hardware, in a software module executed by one or more devices included in the inventory system, or in a combination of the two. A software module can reside in RAM memory, flash memory, ROM memory, EPROM memory, EEPROM memory, registers, hard disk, a removable disk, a CD-ROM, or similar form of a non-transitory computer-readable storage medium. An illustrative storage medium can be coupled to the inventory system such that the inventory system (or a device included therein) can read information from, and write information to, the storage medium. In the alternative, the storage medium can be integral to the inventory system or device having a need therefor.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth.

Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein "receive" or "receiving" may include specific algorithms for obtaining information. For example, receiving may include transmitting a request message for the information. The request message may be transmitted via a network as described above. The request message may be transmitted according to one or more well-defined, machine readable standards which are known in the art. The request message may be stateful in which case the requesting device and the device to which the request was transmitted maintain a state between requests. The request message may be a stateless request in which case the state information for the request is contained within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein "generate" or "generating" may include specific algorithms for creating information based on or using other input information. Generating may include retrieving the input information such as from memory or as provided input parameters to the hardware performing the generating. Once obtained, the generating may include combining the input information. The combination may be performed through specific circuitry configured to provide an output indicating the result of the generating. The combination may be dynamically performed such as through dynamic selection of execution paths based on, for example, the input information, device operational characteristics (e.g., hardware resources available, power level, power source, memory levels, network connectivity, bandwidth, and the like). Generating may also include storing the generated information in a memory location. The memory location may be identified as part of the request message that initiates the generating. In some implementations, the generating may return location information identifying where the generated information can be accessed. The location information may include a memory location, network locate, file system location, or the like.

As used herein, "activate" or "activating" may refer to causing or triggering a mechanical, electronic, or electromechanical state change to a device. Activation of a device may cause the device, or a feature associated therewith, to change from a first state to a second state. In some implementations, activation may include changing a characteristic from a first state to a second state such as, for example, changing the viewing state of a lens of stereoscopic viewing glasses. Activating may include generating a control message indicating the desired state change and providing the control message to the device to cause the device to change state.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

The invention claimed is:

1. A system comprising:
a plurality of robots programmed to move within a physical area according to scheduled routes, a scheduled route identifying a path that a robot in the plurality of robots is scheduled to traverse within the physical area, wherein the physical area includes a set of sectors; and
a computing system programmed to use the scheduled routes of the robots to generate, based at least in part on a number of times a path for a robot enters respective sectors included in the set of sectors, a traffic density map for the physical area, and to transmit the traffic density map to a user device to assist a human subject in navigating the physical area so as to reduce disruption to robot movement.

2. The system of claim 1 wherein the computing system is further programmed to transmit suggested route information derived from the traffic density map to further assist the human subject in navigating the physical area so as to reduce disruption to robot movement.

3. The system of claim 1, wherein the robots include a rolling element and a motor, and wherein modifying a scheduled route includes adjusting a speed of the motor to avoid a collision upon detecting an obstructing object.

4. The system of claim 1, wherein the computing system is further programmed to:
  obtain a map of the physical area where the user device is located;
  partition the map of the physical area into sectors; and
  for each of the sectors, generate a count representing the number of times a path enters the respective sector, wherein the count for a sector indicates robotic traffic density for the sector, wherein the traffic density map is generated using the counts for each sector.

5. A computer-implemented method comprising:
  by a computing system under control of specific computer-executable instructions,
    receiving route information for autonomous assets operating within a physical area, the route information identifying a path each autonomous asset is scheduled to traverse within the physical area, wherein the physical area includes a set of sectors;
    for sector included in the set of the sectors, generating a traffic density value based at least in part on a number of times a path for an autonomous asset enters the respective sector;
    generating a density map for the physical area, wherein each sector in the density map is assigned a color based at least in part on the traffic density value and
    causing display of the density map via a user device to facilitate human navigation of the physical area.

6. The computer-implemented method of claim 5, further comprising receiving, from a communication device located within the physical area, a request for the density map, wherein the density map is generated in response to the request.

7. The computer-implemented method of claim 6, wherein the request includes location information identifying a location within the physical area of the communication device; and
  wherein the method further comprises identifying sectors to include in the set of sectors that are within a threshold distance of the location.

8. The computer-implemented method of claim 6, wherein the request includes: (i) location information identifying a location within the physical area of the communication device, and (ii) a destination location within the physical area, the destination location identifying where the communication device will be taken within the physical area, and
  wherein the method further comprises:
    identifying sectors forming a path from the location to the destination location with a lowest traffic density for the sectors forming the path; and
    including a visual representation of the path on the density map.

9. The computer-implemented method of claim 6, wherein the request includes: (i) location information identifying a location within the physical area of the communication device, and (ii) a destination location within the physical area, the destination location identifying where the communication device will be taken within the physical area;
  wherein the method further comprises generating a time estimate for the communication device to move from the location to the destination location, the time estimate generated using: (i) a distance of the path, and (ii) a rate of travel; and
  wherein the route information is received for routes planned for a period of time starting at least at a time the request is received from the communication device and lasting for at least the time estimate.

10. The computer-implemented method of claim 5, further comprising:
  receiving, from a data storage device, previously generated traffic density value for each of the sectors, each previously generated traffic density value with a time prior to a time the density map request is received; and
  for each of the sectors in the set of sectors, generating a weighted historical density value based at least in part on the previously generated traffic density value, wherein a weight for a previously generated traffic density value for a sector reduces a contribution of the previously generated traffic density value to the density value for the sector.

11. The computer-implemented method of claim 10, further comprising:
  generating a time weight indicating a difference between the time the traffic density map request is received and the time associated with the previously generated traffic density value,
  wherein the weight for a previously generated traffic density value is inversely correlated with the difference, and wherein the weight for the previously generated traffic density value includes the time weight.

12. The computer-implemented method of claim 5, further comprising:
  identifying a set of items carried by an autonomous asset;
  generating a priority for the route of the autonomous asset based on a number of items in the set of items, wherein the priority is positively correlated with the number of items; and
  weighting, proportional to the priority, an amount contributed to the traffic density value for a sector traversed by the path of the autonomous asset, wherein sectors with high priority routes indicate higher densities than sectors having lower priority routes.

13. A system comprising:
  a robotic route planning system configured to schedule and transmit routes for robots operating within a physical area, each route identifying a path a robot will traverse within the physical area;
  a data store storing specific computer-executable instructions; and
  a computing system in communication with the data store, the computing system including a processor, and being programmed with specific computer-executable instructions that direct the computing system to at least:
    receive, from the route planning system, the routes for the robots within the physical area, wherein the physical area includes a set of sectors;
    for sectors included in the set of the sectors, generate a traffic density value based at least in part on a number of times a path for robot enters the respective sector;

generate a density map for the physical area, wherein each sector in the density map is assigned a display property based at least in part on the traffic density value; and transmit the density map to a user device to assist a human subject in navigating the physical area.

14. The system of claim 13, wherein the processor executes the specific computer-executable instructions to further cause the system to receive, from a communication device located within the physical area, a request for the density map, wherein the density map is generated in response to the request.

15. The system of claim 14, wherein the request includes a location information identifying a location within the physical area of the communication device; and wherein the processor executes the specific computer-executable instructions to further cause the system to identify sectors to include in the set of sectors that are within a threshold distance of the location.

16. The system of claim 14, wherein the request includes: (i) location information identifying a location within the physical area of the communication device, and (ii) a destination location within the physical area, the destination location identifying where the communication device will be taken within the physical area, and wherein the processor executes the specific computer-executable instructions to further cause the system to:
identify sectors forming a path from the location to the destination location with a lowest traffic density for the sectors forming the path; and
include a visual representation of the path on the density map.

17. The system of claim 14, wherein the request includes: (i) location information identifying a location within the physical area of the communication device, and (ii) a destination location within the physical area, the destination location identifying where the communication device will be taken within the physical area;

wherein the processor executes the specific computer-executable instructions to further cause the system to generate a time estimate for the communication device to move from the location to the destination location, the time estimate generated using: (i) a distance of the path, and (ii) a rate of travel; and; and wherein route information is received for routes planned for a period of time starting at least at a time the request is received from the communication device and lasting for at least the time estimate.

18. The system of claim 14, wherein the processor executes the specific computer-executable instructions to further cause the system to:

receive, from a data storage device, previously generated traffic density value for each of the sectors, each previously generated traffic density value with a time prior to a time the density map request is received; and for each of the sectors in the set of sectors, generate a weighted historical density value based at least in part on the previously generated traffic density value, wherein a weight for a previously generated traffic density value for a sector reduces a contribution of the previously generated traffic density value to the density value for the sector.

19. The system of claim 13, wherein the processor executes the specific computer-executable instructions to further cause the system to:

identify a set of items carried by a robot;

generate a priority for the route of the robot based on a number of items in the set of items, wherein the priority is positively correlated with the number of items; and weight an amount contributed to the traffic density value for a sector traversed by the path of the robot, wherein sectors with high priority routes indicate higher densities than sectors having lower priority routes.

20. The system of claim 14, wherein the user device comprises the communication device.

* * * * *